United States Patent
Egretzberger et al.

(10) Patent No.: US 9,535,084 B2
(45) Date of Patent: Jan. 3, 2017

(54) METHOD FOR THE DECOUPLED CONTROL OF THE QUADRATURE AND THE RESONANCE FREQUENCY OF A MICRO-MECHANICAL ROTATION RATE SENSOR BY MEANS OF SIGMA-DELTA-MODULATION

(75) Inventors: Markus Egretzberger, Atzenbrugg (AT); Andreas Kugi, Vienna (AT); Florian Mair, Vienna (AT); Michael Maurer, Rheinhausen (DE); Yiannos Manoli, Freiburg (DE); Thomas Northemann, Freiburg (DE)

(73) Assignees: Continental Teves AG & Co. oHG, Frankfurt (DE); Albert-Ludwigs-University of Freiburg, Freiburg (DE)

( * ) Notice: Subject to any disclaimer, the term of this patent is extended or adjusted under 35 U.S.C. 154(b) by 1137 days.

(21) Appl. No.: 13/634,585

(22) PCT Filed: Mar. 17, 2011

(86) PCT No.: PCT/EP2011/054090
§ 371 (c)(1),
(2), (4) Date: Nov. 13, 2012

(87) PCT Pub. No.: WO2011/113917
PCT Pub. Date: Sep. 22, 2011

(65) Prior Publication Data
US 2013/0197858 A1 Aug. 1, 2013

(30) Foreign Application Priority Data
Mar. 17, 2010 (DE) .................. 10 2010 011 781

(51) Int. Cl.
*G01P 3/00* (2006.01)
*G01P 3/14* (2006.01)
(Continued)

(52) U.S. Cl.
CPC ................. *G01P 3/14* (2013.01); *G01C 19/56* (2013.01); *G01C 19/5712* (2013.01); *G01C 19/5726* (2013.01)

(58) Field of Classification Search
USPC .......................................... 702/145
See application file for complete search history.

(56) References Cited

U.S. PATENT DOCUMENTS 5,481,914 A * 1/1996 Ward ...................... H03F 1/083
73/504.16
5,847,279 A 12/1998 Piazza
(Continued)

FOREIGN PATENT DOCUMENTS

CN 1898528 1/2007
CN 102893128 1/2013
(Continued)

OTHER PUBLICATIONS

Office Action mailed Aug. 12, 2015 in U.S. Appl. No. 13/634,301.
(Continued)

*Primary Examiner* — Paul D Lee
(74) *Attorney, Agent, or Firm* — RatnerPrestia

(57) ABSTRACT

A method for the precise measuring operating of a micro-mechanical rotation rate sensor, including at least one seismic mass, at least one drive device for driving the seismic mass in the primary mode ($q_1$) and at least three trimming electrode elements which are jointly associated directly or indirectly with the seismic mass. An electric trimming voltage ($u_1$, $u_2$, $u_3$, $u_4$) is set respectively between the trimming electrode elements and the seismic mass. Each of the electric trimming voltages ($u_1$, $u_2$, $u_3$, $u_4$) are adjusted in accordance with a resonance frequency variable ($\tilde{u}_T$, $\tilde{U}_{T,0}$), a quadrature variable ($\tilde{u}_c$, $\tilde{U}_{C,0}$) and a restoring variable ($\tilde{u}_S$).

15 Claims, 6 Drawing Sheets

(51) Int. Cl.
*G01C 19/5712* (2012.01)
*G01C 19/5726* (2012.01)
*G01C 19/56* (2012.01)

(56) References Cited

U.S. PATENT DOCUMENTS

| | | |
|---|---|---|
| 6,067,858 A | 5/2000 | Clark et al. |
| 6,089,089 A | 7/2000 | Hsu |
| 6,250,156 B1 | 6/2001 | Seshia |
| 7,337,665 B2 | 3/2008 | Schroeder |
| 7,481,110 B2 | 1/2009 | Handrich et al. |
| 7,805,993 B2 | 10/2010 | Spahlinger |
| 8,661,898 B2 | 3/2014 | Watson |
| 2001/0039834 A1 | 11/2001 | Hsu |
| 2003/0061877 A1 | 4/2003 | Stewart |
| 2003/0159510 A1 | 8/2003 | Stewart |
| 2004/0173023 A1* | 9/2004 | Yan .................. G01C 19/5719 73/504.12 |
| 2005/0082252 A1* | 4/2005 | Nasiri ............... G01C 19/5719 216/2 |
| 2005/0268716 A1* | 12/2005 | Hrovat .............. G01C 19/5719 73/504.12 |
| 2006/0010999 A1 | 1/2006 | Schroeder |
| 2006/0020409 A1 | 1/2006 | Schroeder |
| 2006/0101910 A1 | 5/2006 | Schroeder |
| 2007/0144255 A1 | 6/2007 | Handrich |
| 2008/0284628 A1* | 11/2008 | Willig ................. H03M 3/404 341/143 |
| 2010/0186503 A1 | 7/2010 | Spahlinger |
| 2010/0294039 A1* | 11/2010 | Geen .................. G01C 19/5776 73/504.12 |
| 2013/0197858 A1 | 8/2013 | Egretzberger |
| 2013/0199263 A1 | 8/2013 | Egretzberger |

FOREIGN PATENT DOCUMENTS

| | | |
|---|---|---|
| DE | 102 48 733 A1 | 5/2004 |
| DE | 103 20 675 A1 | 12/2004 |
| DE | 103 60 962 A2 | 7/2005 |
| EP | 2547984 | 1/2013 |
| WO | WO 03/010492 A1 | 2/2003 |
| WO | WO 2004/038331 A1 | 5/2004 |
| WO | WO 2005/066585 A1 | 7/2005 |
| WO | WO 2008/031480 A1 | 3/2008 |

OTHER PUBLICATIONS

International Search Report for PCT International Application No. PCT/EP2011/054090 mailed Jun. 28, 2011.
German Search Report for Application No. DE 10 2011 005 745.5 dated Apr. 13, 2012.
Final Office Action mailed Dec. 14, 2015 in U.S. Appl. No. 13/634,301.
German Search Report corresponding to German Application No. 10 2011 005 744.7 dated Apr. 12, 2012.
International Search Report corresponding to International Application No. PCT/EP2011/054089, dated Jun. 28, 2011.
Entire patent prosecution history of U.S. Appl. No. 13/634,301, filed Nov. 13, 2012, entitled, "Method for the Decoupled Control of the Quadrature and the Resonance Frequency of a Micro-Mechanical Gyroscope."

* cited by examiner

METHOD FOR THE DECOUPLED CONTROL OF THE QUADRATURE AND THE RESONANCE FREQUENCY OF A MICRO-MECHANICAL ROTATION RATE SENSOR BY MEANS OF SIGMA-DELTA-MODULATION

CROSS REFERENCE TO RELATED APPLICATIONS

This application is the U.S. National Phase Application of PCT/EP2011/054090, filed Mar. 17, 2011, which claims priority to German Patent Application No. 10 2010 011 781.1, filed Mar. 17, 2010, the contents of such applications being incorporated by reference herein.

FIELD OF THE INVENTION

The invention relates to a method according to a method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, and to a micro-mechanical rotation rate sensor having at least three trimming electrode elements which are jointly associated with a first seismic mass.

BACKGROUND OF THE INVENTION

It is known that micro-mechanical springs for suspending seismic masses in rotation rate sensors to a certain extent already cause deflections in the reading-out direction in the drive mode or primary mode owing to relatively small fabrication inaccuracies which lead, in particular, to undesired edge angles of the respective structures without the presence of a rotation rate. As a result, interference signals are generated which can be undesirably evaluated as rotation rate signal components and therefore falsify the rotation rate signal or cause a measuring error with respect to the rotation rate signal.

Such undesired edge angles or tilting of springs are process-induced and can be avoided only to a limited degree. The interference signals described above, which do not come about owing to a detected rotation rate but rather owing to faulty deflections in the reading-out direction as a function of the deflection of the seismic mass and the springs thereof in the drive direction, are also referred to as quadrature or quadrature signals.

Document WO 03/010492 A1, which is incorporated by reference, proposes a method for suppressing quadrature signals in a rotation rate sensor which comprises two trimming electrode arrangements which are associated with a seismic mass, in which method the quadrature of the rotation rate sensor is suppressed by means of the voltage applied to the trimming electrodes. However, this quadrature suppression can undesirably influence the resonance frequency of the reading-out mode of the rotation rate sensor, as a result of which the differential frequency between the resonance frequencies is also changed with respect to the drive mode or primary mode and the reading-out mode or secondary mode of the rotation rate sensor. This is all the more disadvantageous since the voltage which is applied to the trimming electrodes is included quadratically in the shifting of the resonance frequency of the reading-out mode.

It is customary that the embodiment of the quadrature of rotation rate sensors of a wafer varies to a relatively high degree owing to process fluctuations and differs to a relatively high degree from one rotation rate sensor to another of a wafer.

Furthermore, it is known to reset the deflection of the seismic mass/masses of a rotation rate sensor with respect to the reading-out mode or secondary mode by means of at least one trimming electrode element or a trimming electrode. However, this also usually influences the resonance frequency of the secondary oscillator, as well as influencing possible quadrature suppression.

BRIEF DESCRIPTION OF THE INVENTION

An aspect of the invention proposes a method for the measuring operation of a rotation rate sensor and a corresponding rotation rate sensor with which resetting of the deflection of the secondary mode can be carried out jointly on the basis of a detected rotation rate, quadrature suppression and a resonance frequency setting of the secondary oscillator, in particular in such a way that these three influences can be implemented or set at least partially independently of one another.

This is achieved according to the invention by means of a method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, wherein in each case an electric trimming voltage ($u_1$, $u_2$, $u_3$, $u_4$) is applied between each of these trimming electrode elements and the seismic mass, wherein each of these electric trimming voltages ($u_1$, $u_2$, $u_3$, $u_4$) is set as a function of a resonance frequency manipulated variable ($\tilde{u}_T$, $\tilde{U}_{T,0}$), a quadrature manipulated variable ($\tilde{u}_C$, $\tilde{U}_{C,0}$) and a resetting variable ($\tilde{u}_S$) and a micro-mechanical rotation rate sensor, comprising at least one seismic mass, at least one drive device for driving the seismic mass in the primary mode and at least three trimming electrode elements which are jointly associated directly or indirectly with the seismic mass, wherein in each case an electric trimming voltage is applied between each of these trimming electrode elements and the seismic mass, wherein the rotation rate sensor is embodied in such a way that it is suitable for carrying out the method comprising: a method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, wherein in each case an electric trimming voltage ($u_1$, $u_2$, $u_3$, $u_4$) is applied between each of these trimming electrode elements and the seismic mass, wherein each of these electric trimming voltages ($u_1$, $u_2$, $u_3$, $u_4$) is set as a function of a resonance frequency manipulated variable ($\tilde{u}_T$, $\tilde{U}_{T,0}$), a quadrature manipulated variable ($\tilde{u}_C$, $\tilde{U}_{C,0}$) and a resetting variable ($\tilde{u}_S$).

The method and the rotation rate sensor are preferably embodied or designed in such a way that at least the setting of the resonance frequency can be implemented independently of the resetting of the deflection of the seismic mass on the basis of a detected rotation rate and the quadrature suppression, and that, in particular, it is also possible to set independently of one another the resetting of the deflection on the basis of a detected rotation rate or the entire deflection of the at least one seismic mass within the scope of the secondary mode, and the quadrature suppression.

The quadrature manipulated variable is preferably defined as a static manipulated variable for suppressing the deflection or oscillation of the secondary mode owing to the quadrature. As a result, in particular, an undesired quadrature signal or a quadrature signal component of the output signal of the rotation rate sensor, which is phase-shifted essentially through 90° or 270° with respect to the component of the output signal of the rotation rate sensor which forms the rotation rate, is suppressed.

The resetting manipulated variable is expediently a harmonic oscillation signal whose amplitude is determined by the output of the first controller unit, wherein this amplitude value is multiplied by a harmonic oscillation signal which has the same frequency as the primary mode or drive mode.

The resonance frequency manipulated variable is preferably defined as a static variable with which the frequency difference between the resonance frequency of the reading-out mode and the resonance frequency of the drive mode has substantially a defined value or is adjusted to a defined value or alternatively is preferably essentially zero or is adjusted to zero.

A drive mode or primary mode is preferably understood to be a natural mode of a rotation rate sensor, preferably the natural oscillation, particularly preferably the oscillation at a resonance frequency of the at least one seismic mass in which the seismic mass of the rotation rate sensor oscillates, in particular, continuously. Quite particularly preferably, the rotation rate sensor has at least two seismic masses which are coupled to one another and which oscillate in anti-phase or are each deflected in the same direction with an inverse orientation to one another in the course of the drive mode.

A reading-out mode or secondary mode is preferably understood to be a natural mode which is preferably set owing to a rotation rate and the associated effect of the Coriolis force.

It is preferred that the rotation rate sensor comprises at least four trimming electrode elements which are jointly associated directly or indirectly with the seismic mass, wherein a first electric trimming voltage is applied between the first trimming electrode element and the seismic mass, a second trimming voltage is applied between the second trimming electrode element and the seismic mass, a third trimming voltage is applied between the third trimming electrode element and the seismic mass, and a fourth trimming voltage is applied between the fourth trimming electrode element and the seismic mass, wherein the first trimming voltage $u_1$, the second trimming voltage $u_2$, the third trimming voltage $u_3$ and the fourth trimming voltage $u_4$ are each set substantially with the following dependence of the resonance frequency manipulated variable $\tilde{u}_T$, the quadrature manipulated variable $\tilde{u}_C$ and the resetting variable $\tilde{u}_S$:
$u_1=\sqrt{\tilde{u}_T-\tilde{u}_C+\tilde{u}_S}$, $u_2=\sqrt{\tilde{u}_T+\tilde{u}_C-\tilde{u}_S}$, $u_3=\sqrt{\tilde{u}_T+\tilde{u}_C+\tilde{u}_S}$, $u_4=\sqrt{\tilde{u}_T-\tilde{u}_C-\tilde{u}_S}$.

The resetting variable is alternatively preferably also understood to be $\tilde{U}_{SD}$ and/or the resonance frequency manipulated variable to be $\tilde{U}_{T,0}$ and/or the quadrature manipulated variable to be $\tilde{U}_{C,0}$.

The trimming electrode elements are preferably each embodied and arranged in such a way that a capacitance $C_1$, $C_2$, $C_3$ and $C_4$ is formed between the first, second, third and fourth trimming electrode element and a respectively associated mass electrode element of the associated seismic mass, with the associated trimming voltage being applied between the trimming electrode element and the mass electrode element, as follows:

$$C_1=\varepsilon_0\frac{A_1+r_1t_1q_1}{g_1-s_1q_2}, C_2=\varepsilon_0\frac{A_2+r_2t_2q_1}{g_2+s_2q_2}, C_3=\varepsilon_0\frac{A_3-r_3t_3q_1}{g_3-s_3q_2},$$

and $$C_4=\varepsilon_0\frac{A_4-r_4t_4q_1}{g_4+s_4q_2},$$

where i is in each case an index relating to the numbering of the electrode elements, $g_i$ is the distance over the gap between the trimming electrode element and the associated mass electrode element in the undeflected state, $A_i$ is the overlapping area between the trimming electrode element and the associated mass electrode element in the undeflected state, the product $\pm r_i$ times $t_i$ times $q_1$ is the change in the overlapping area as a function of the deflection of the primary mode $q_1$, wherein $t_i$ is the overlapping depth between the trimming electrode element and the associated mass electrode element and $r_i$ is a first positive geometric constant relating to the deflection of the primary mode $q_1$, and the product $\pm s_i$ times $q_2$ is the change in the distance over the gap between the trimming electrode element and the mass electrode element as a function of the deflection of the secondary mode $q_2$, wherein $s_i$ is a second positive geometric constant relating to the deflection of the secondary mode $q_2$.

The trimming electrode elements are preferably embodied as planar capacitor plates which are arranged substantially parallel to the x-y plane of a Cartesian coordinate system. In this context, the deflection, defined by the product $\pm r_i * q_1$, of the mass electrode elements takes place, in particular, in the x direction relative to the trimming electrode elements. The overlapping depth $t_i$ of the trimming electrode elements is oriented here in the y direction. The deflection of the mass electrode elements in the z direction relative to the trimming electrode elements is particularly preferably oriented in the z direction.

$A_i$, $r_i$, $t_i$, $g_i$ and $s_i$ are preferably substantially the same in all the trimming electrode element/mass electrode element pairs, that is to say $A_1=A_2=A_3=A_4$, and correspondingly there are respectively identical values for i-th values of $r_i$, $t_i$, $g_i$ and $s_i$.

It is preferred that the rotation rate sensor comprises a control arrangement in which firstly a control error variable is formed from the controlled variable with predefinition of a control reference variable, wherein the controlled variable represents the detected deflection of the seismic mass in the direction of its secondary mode, and wherein the control reference variable is a harmonic frequency identification signal ($y_D$) with the frequency $\omega_s$ modulated with the frequency of the primary mode ($\omega_1$), or such a frequency identification signal is superimposed on the control reference variable, after which the control error variable formed in this way is fed to a first controller unit in which at least the resetting variable is generated. In particular, the resetting variable is then demodulated with two harmonic signals, phase-shifted through 90° with respect to one another, in a first demodulator unit, as a result of which a quadrature variable and a rotation rate variable are acquired, after which a quadrature control error variable is generated from the quadrature variable as a function of a quadrature reference variable, in particular with the value "0", which quadrature control error variable is fed to a quadrature controller unit which makes available the quadrature manipulated variable on the output side, and wherein the rotation rate variable or quadrature variable is demodulated in a second demodulator unit with the frequency $\omega_s$, as a result of which a frequency variable is acquired, after which a frequency control error variable is generated from the frequency variable as a function of a frequency reference variable, in particular with the value "0", which frequency control error variable is fed to a frequency controller unit which makes available the resonance frequency manipulated variable $\tilde{u}_T$ on the output side.

It is expedient that the rotation rate sensor comprises a control arrangement in which firstly a control error variable is formed from the controlled variable with predefinition of a control reference variable, wherein the controlled variable represents the detected deflection of the seismic mass in the direction of its secondary mode, and wherein the control reference variable is a harmonic frequency identification signal ($y_D$) with the frequency $\omega_s$ modulated with the frequency of the primary mode ($\omega_1$), or such a frequency identification signal is superimposed on the control reference variable, after which the control error variable which is formed in this way is fed to a first controller unit whose output signal is then demodulated with two harmonic signals, phase-shifted through 90° with respect to one another, in a first demodulator unit, as a result of which a quadrature variable and a rotation rate variable are acquired, after which a quadrature control error variable is generated from the quadrature variable as a function of a quadrature reference variable, in particular with the value "0", which quadrature control error variable is fed to a quadrature controller unit which makes available the quadrature manipulated variable on the output side and wherein the rotation rate variable or quadrature variable is demodulated in a second demodulator unit with the frequency $\omega_s$, as a result of which a frequency variable is acquired, after which a frequency control error variable is generated from the frequency variable as a function of a frequency reference variable, in particular with the value "0", which frequency control error variable is fed to a frequency controller unit which makes available the resonance frequency manipulated variable on the output side.

In particular, the rotation rate sensor has a resetting unit which makes available the resetting variable, wherein this resetting variable has, particularly preferably, a defined constant resetting value.

It is preferred that the control arrangement comprises a sigma-delta converter with which the controlled variable is digitized directly or at least a variable dependent thereon is digitized, and after which the resonance frequency manipulated variable, the quadrature manipulated variable and the resetting variable are generated as digital variables.

The sigma-delta modulator is embodied, in particular, as an electro-mechanical sigma-delta modulator.

The sigma-delta modulator particularly preferably comprises a capacitance/voltage converter which is arranged upstream of the first controller unit on the input side, the first controller unit itself, a quantizer which is connected to the latter on the output side, for example with the sampling frequency $f_s$, and a digital/analog converter and a voltage/force transducer for feeding back the control process.

It is expedient that the output signal of the first controller unit is digitized, and at least the first demodulator unit, the second demodulator unit, the quadrature controller unit and the frequency controller unit are embodied in a digital form, and, in particular, in addition the manipulated variable transformation unit and/or the resetting unit are also embodied in a digital form.

Preferably, in each case two trimming voltages are processed in pairs, in each case by means of one mixer, in each case in pairs as a function of the digital output signal of the quantizer.

It is preferred that the first and the fourth trimming voltages are processed by means of a first mixer (M1), and the second and the third trimming voltages are processed by means of a second mixer (M2), in each case as a function of the digital output signal of the quantizer.

The rotation rate sensor, in particular the control arrangement thereof, preferably has a manipulated variable transformation unit which makes available the trimming voltages $u_1$, $u_2$, $u_3$ and $u_4$ as a function of the resonance frequency manipulated variable $\tilde{u}_T$, the quadrature manipulated variable $\tilde{u}_C$ and the resetting variable $\tilde{u}_S$, in accordance with the equations $$u_1 = \sqrt{\tilde{u}_T - \tilde{u}_C + \tilde{u}_S}, \; u_2 = \sqrt{\tilde{u}_T + \tilde{u}_C - \tilde{u}_S},$$

$$u_3 = \sqrt{\tilde{u}_T + \tilde{u}_C + \tilde{u}_S}, \; u_4 = \sqrt{\tilde{u}_T - \tilde{u}_C - \tilde{u}_S}.$$

It is preferred that the rotation rate sensor is embodied in such a way that it can detect rotation rates about at least two different axes, that is to say the rotation rate sensor is of "multi-axis" design.

It is preferred that the first and the second trimming electrode elements are embodied and arranged in a substantially non-movable fashion, in particular in relation to the respective electrode face of said electrode element, and are electrically insulated and arranged spaced apart from the seismic mass.

The trimming electrode elements are expediently insulated from one another and particularly preferably each of identical design.

The rotation rate sensor expediently has two seismic masses which are coupled to one another.

It is expedient that the first and the second trimming electrode elements each have at least one electrode face, which electrode faces are arranged substantially parallel and opposite a trimming face of the seismic mass, and wherein the electrode faces of the first and second trimming electrode elements are always associated with a region of the trimming face lying opposite and/or said electrode faces overlap this region, in particular independently of the deflection state of the seismic mass, at least up to a defined amplitude/deflection, particularly preferably even in the case of maximum deflection of the seismic mass. The electrode faces expediently protrude in this case always beyond the region of the trimming face lying opposite. The electrode faces and the trimming face are quite particularly preferably of substantially planar design.

A micro-mechanical rotation rate sensor is preferably understood to be a micro-mechanical gyroscope.

An aspect of the invention also relates to the use of the rotation rate sensor in motor vehicles, in particular in a motor vehicle control system.

The method according to an aspect of the invention and the rotation rate sensor according to an aspect of the invention can be used in different regions for detecting one or more rotation rates and/or by means of corresponding signal processing for detecting one or more rotational accelerations. In this context, their use is preferred in vehicles, in particular in motor vehicles and aircraft, in automation technology, in navigation systems, in image stabilizers of cameras, in industrial robotics and in games consoles, and particularly preferably in the respective corresponding control systems in this context. The use of the method and of the rotation rate sensor in/as yaw rate sensor/sensors and/or in/as yaw acceleration sensor/sensors in a motor vehicle control system such as, for example, ESP, is quite particularly preferred.

BRIEF DESCRIPTION OF THE DRAWINGS

The invention is best understood from the following detailed description when read in connection with the accompanying drawing.

In the drawing, in each case in a schematic illustration.

DETAILED DESCRIPTION OF THE INVENTION

Figure 1:
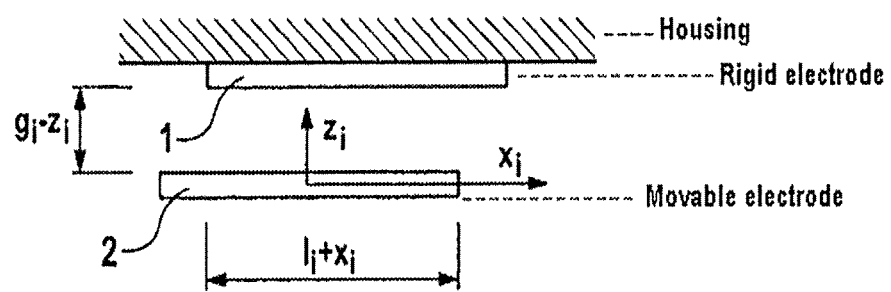
FIG. 1 shows an exemplary embodiment of a capacitor formed from a trimming electrode element, which is positionally fixed with respect to the sensor housing, and from a mass electrode element which is connected to the seismic mass or is embodied as a part thereof.

The exemplary capacitor which is illustrated in FIG. 1 and is composed of a trimming electrode element 1 and a mass electrode element 2 is as a parallel-plate capacitor, wherein the distance or the distance $g_t$ over the gap is embodied in the z direction between the two electrodes, and the deflection of the mass electrode element in the primary mode occurs in the x direction, wherein the change in the overlapping area occurs in the x direction, and the deflection of the mass electrode element in the secondary mode occurs in the z direction.

Figure 2:
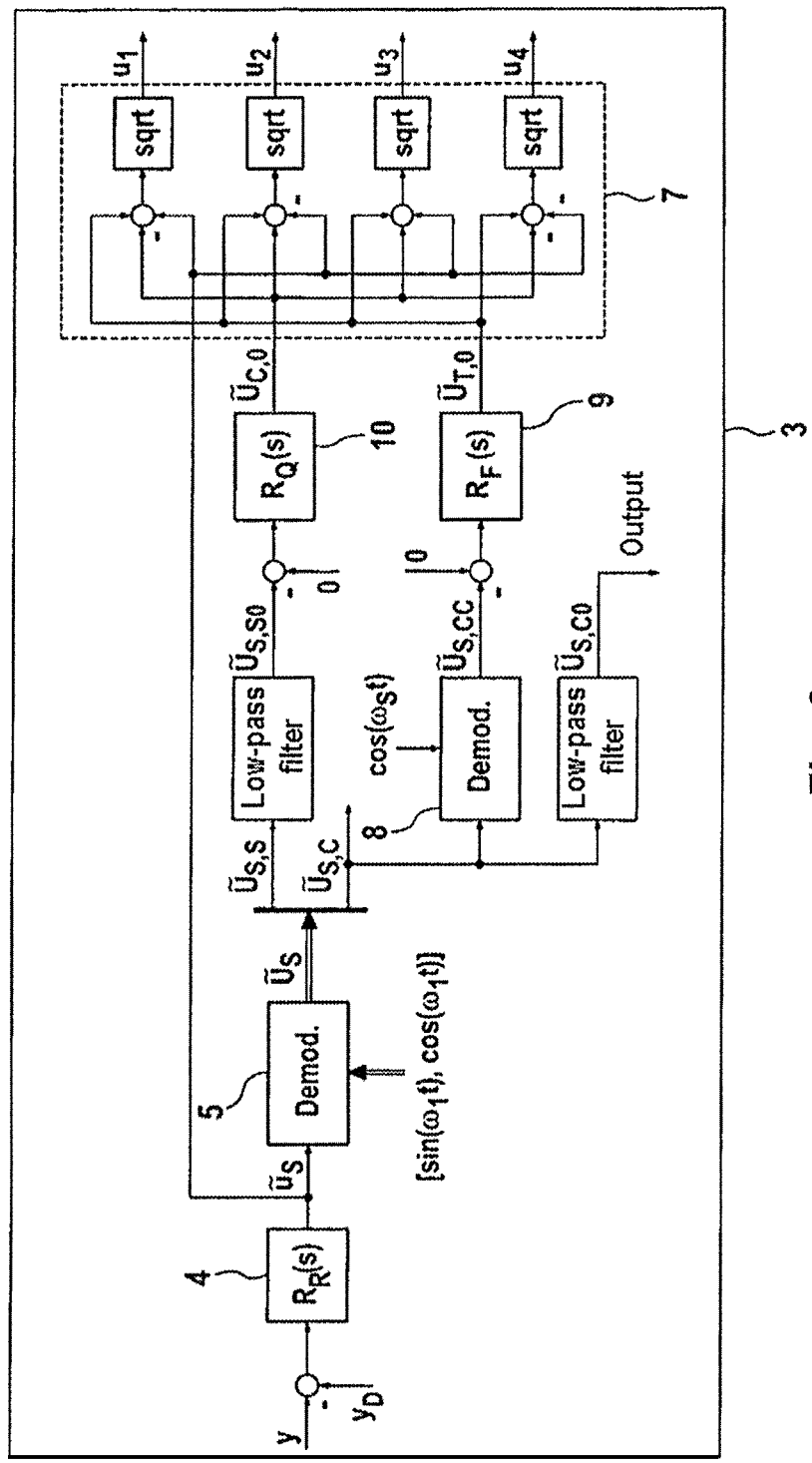
FIG. 2 shows an exemplary embodiment of a method or rotation rate sensor in which a frequency identification signal is predefined as a harmonic setpoint value upstream of the first controller and before demodulation as a reference variable of the controlled variable.

FIG. 2 illustrates an exemplary method or an exemplary rotation rate sensor comprising a control arrangement 3 in which firstly a control error variable is formed from the controlled variable y with predefinition of a control reference variable $y_D$, wherein the controlled variable y represents the detected deflection of the seismic mass in the direction of its secondary mode, and wherein the control reference variable is a harmonic frequency identification signal with the frequency $\omega_s$ modulated with the frequency of the primary mode $\omega_1$, after which the control error variable which is formed in this way is fed to a first controller unit 4 in which the resetting variable $\tilde{u}_S$ is generated.

The resetting variable $\tilde{u}_S$ is, on the one hand, fed directly to the manipulated variable transformation unit 7 and, furthermore, the resetting variable $\tilde{u}_S$ is demodulated with two harmonic signals, phase-shifted through 90° with respect to one another, in a first demodulator unit 5, as a result of which a quadrature variable $\tilde{u}_{S,S}$ and a rotation rate variable $\tilde{u}_{S,C}$ are acquired, jointly symbolized as $\tilde{u}_S$, after which a quadrature control error variable is generated from the quadrature variable $u_{S,S}$ as a function of a quadrature reference variable, in particular with the value "0", which quadrature control error variable is fed to a quadrature controller unit 10 which makes available the quadrature manipulated variable $\tilde{u}_c$, or referred to here as $\tilde{u}_{C,0}$, on the output side, and wherein the rotation rate variable $\tilde{u}_{S,C}$ demodulated in a second demodulator unit 8 with the frequency $\omega_s$, as a result of which a frequency variable $\tilde{u}_{S,CC}$ is acquired, after which a frequency control error variable is generated from the frequency variable as a function of a frequency reference variable, in particular with the value "0", which frequency control error variable is fed to a frequency controller unit 9 which makes available the resonance frequency manipulated variable $\tilde{u}_T$, referred to here as $\tilde{u}_T 0$, on the output side. The rotation rate variable $\tilde{U}_{S,C}$ is also low-pass-filtered and forms the output signal $\tilde{U}_{S,C0}$ of the sensor which contains the information about the detected rotation rate.

The manipulated variable transformation unit 7 makes available the trimming voltages $u_1$, $u_2$, $u_3$ and $u_4$, in accordance with the equations $$u_1 = \sqrt{\tilde{u}_T - \tilde{u}_C + \tilde{u}_S}, \quad u_2 = \sqrt{\tilde{u}_T + \tilde{u}_C - \tilde{u}_S},$$

$$u_3 = \sqrt{\tilde{u}_T + \tilde{u}_C + \tilde{u}_S}, \quad u_4 = \sqrt{\tilde{u}_T - \tilde{u}_C - \tilde{u}_S}.$$

Figure 8:
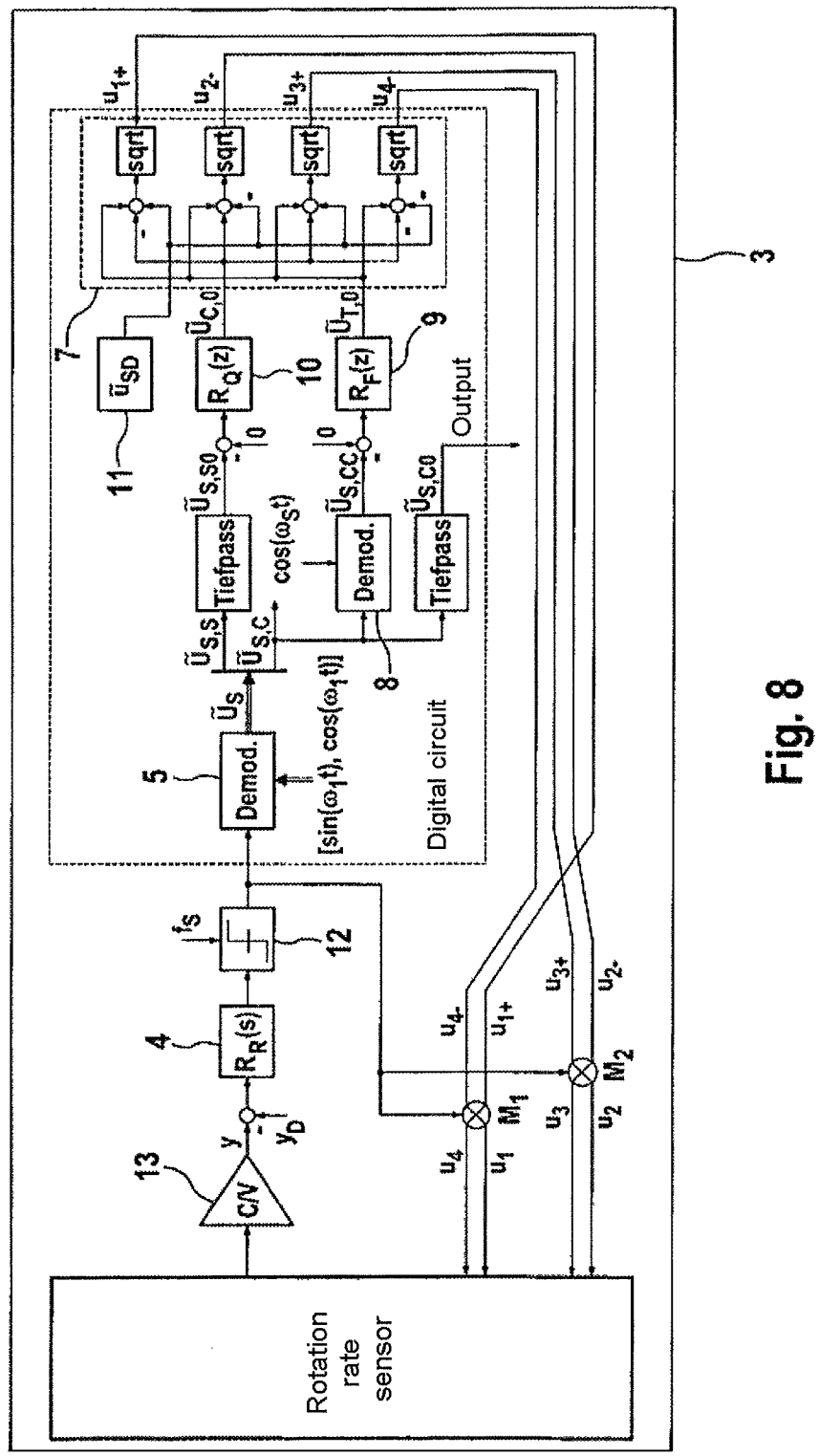
FIG. 8 shows an exemplary embodiment of a method or rotation rate sensor with predefinition of a frequency identification signal as a harmonic setpoint value for the controlled variable, by means of sigma-delta modulation.

FIG. 8 illustrates the rotation rate sensor and therefore also the corresponding method using the sigma-delta modulator. In this context, the rotation rate sensor comprises a control arrangement 3 in which firstly a control error variable is formed from the controlled variable y with predefinition of a control reference variable, wherein the controlled variable y represents the detected deflection of the seismic mass in the direction of its secondary mode, and wherein the control reference variable is a harmonic frequency identification signal with the frequency $\omega_s$ modulated with the frequency of the primary mode $\omega_1$, after which the control error variable formed in this way is fed to a first controller unit 4 whose output signal is then digitized in a quantizer 12 with the clock frequency $f_s$ and the bit sequence which is generated as a result is subsequently demodulated in a digital fashion with two harmonic signals, phase-shifted through 90° with respect to one another, in a first digital demodulator unit 5, as a result of which a quadrature variable $\tilde{u}_{S,S}$ and a rotation rate variable $\tilde{u}_{S,C}$ are acquired, after which a quadrature control error variable is generated from the quadrature variable as a function of a quadrature reference variable, in particular with the value "0", which quadrature control error variable is fed to a quadrature controller unit 10 which makes available the quadrature manipulated variable $\tilde{u}_C$, referred to here as $\tilde{u}_{C,0}$, on the output side.

The rotation rate variable $\tilde{u}_{S,C}$ is demodulated in a second demodulator unit 8 with the frequency $\omega_s$, as a result of which a frequency variable $\tilde{U}_{S,CC}$ is acquired, after which a frequency control error variable is generated from the frequency variable as a function of a frequency reference variable, in particular with the value "0", which frequency control error variable is fed to a frequency controller unit 9 which makes available the resonance frequency manipulated variable referred to here as $\tilde{U}_T 0$, on the output side. The rotation rate variable $\tilde{U}_{S,C}$ is also low-pass-filtered and forms the output signal $\tilde{U}_{S,C0}$ of the sensor which contains the information about the detected rotation rate.

Furthermore, the rotation rate sensor comprises a resetting unit 11 which makes available the resetting variable $\tilde{U}_{SD}$, for example as a defined constant resetting value.

The control arrangement comprises, for example, a sigma-delta converter with which the controlled variable is digitized and after which the resonance frequency manipulated variable, the quadrature manipulated variable and the resetting variable are generated as digital variables. The sigma-delta modulator, embodied as an electro-mechanical sigma-delta modulator, comprises here a capacitance/voltage converter 13 which is arranged upstream of the first controller unit 4 on the input side, the first controller unit 4 itself, a quantizer 12 which is connected to the latter on the output side and having the sampling frequency $f_s$, and a digital/analog converter (not illustrated) and a voltage/force transducer (not illustrated) for feeding back the control process.

The first and the fourth trimming voltages $U_1$, $U_4$ are processed by means of a first mixer M1, and the second and the third trimming voltages $U_2$, $U_3$ are processed by means of a second mixer M2, each as a function of the digital output signal of the quantizer 12.

A description and analysis will be given below by way of example by means of mathematical illustrations:

Typically, micro-electro-mechanical rotation rate sensors have two weakly damped mechanical vibration modes which are orthogonal with respect to one another, the so-called primary and secondary modes, which are coupled by means of the Coriolis effect when a rotation rate occurs. As a result of inaccuracies due to manufacture, further coupling generally occurs between the primary and secondary modes, unbalance effect or quadrature. However, in the output signal of the sensor, the signal components have a phase difference of 90° owing to the Coriolis and unbalance effects. As a result of corresponding demodulation, the output signal can accordingly be decomposed into a rotation rate component and a quadrature component. The conventional control concept of micro-mechanical rotation rate sensors therefore typically comprises a quadrature controller which compensates the signal component owing to the unbalance effect by using an additional actuator system. Any offset drifting of the rotation rate component in the output signal owing to demodulation errors can thereby be avoided. In order to increase sensitivity, generally extremely weakly damped mechanical structures are used. The resulting slow dynamic response behavior of the sensor owing to a rotation rate can be improved by compensating the rotation rate component using further suitable actuators in a resetting controller (also referred to as locking mode). The desired sensor dynamics are then defined by the closed circuit of the resetting controller. The maximum sensitivity of the rotation rate sensor is achieved if the resonance frequencies of the primary and secondary modes are identical. Since the change in sensitivity is already very large in the vicinity of this working point when there are small parameter deviations, it is necessary to control the resonance frequency. The present invention preferably deals with the design of an overall control concept which comprises the quadrature controller, resetting controller and frequency controller.

The sensor type on which this invention is based is expediently a capacitive rotation rate sensor. In this context, the excitation and the reading out of the primary and secondary oscillations are carried out by means of capacitive actuators and sensors. For the rest it will be assumed that, by using suitable capacitive actuators or drive devices, the rotation rate sensor in the primary mode is made to oscillate harmonically with a constant amplitude. The frequency of the oscillation corresponds here to the resonance frequency of the primary mode. If it is also assumed that the amplitude and frequency of the primary oscillation are adjusted ideally to a constant setpoint value, the reaction of the secondary oscillation on the primary oscillation can be ignored and the movement differential equation of the secondary mode can be written in the form $$m_2\ddot{q}_2 + d_2\dot{q}_2 + k_2 q_2 = f_2(q_1, q_2, u_1, \ldots, u_m) + \Omega c_{21}\dot{q}_1 - k_{21}q_1 \quad (1)$$

Here, $q_1$ and $q_2$ denote the primary and secondary modes, $\Omega$ denotes the rotation rate and $u_1, \ldots, u_m$ denote the voltages at the capacitive actuators for influencing the secondary mode. The positive constants $m_2$, $d_2$ and $k_2$ correspond to the coefficient of inertia, the damping coefficient and the rigidity coefficient, while the constants $c_{21}$ and $k_{21}$, which can assume both positive and negative values, correspond to the coupling terms owing to the Coriolis effect and unbalance effect. The nonlinear input term $f_2(q_1, q_2, u_1, \ldots, u_m)$ depends on the arrangement of the capacitive actuators. If parallel-plate capacitors are assumed, as shown in FIG. 1, they can be designed in such a way that both harmonic excitation of the secondary mode and compensation of the coupling term $k_{21}q_1$ are possible by applying a constant voltage component. In addition, the constant component causes the resonance frequency of the secondary mode to be inherently influenced. Firstly, it is assumed that only parallel-plate capacitors with rectangular electrodes are considered. Given a number of m capacitive actuators of this type, FIG. 1 shows the i-th actuator, $i=1, \ldots, m$, composed of an electrode which is rigidly connected to the housing and of a movable electrode. The movable electrode has the translatory degrees of freedom $x_i$ and where $x_i$ and $z_i$ describe the movement of the center point of the movable electrode in the direction of the primary mode or of the secondary mode, that is to say if no other modes are excited the following applies $x_i = \pm r_i q_1$ and $z_i = \pm s_i q_2$ with the positive constants $r_i$ and $s_i$. The capacitance $C_i$ and the stored energy $W_{P,i}$ of the i-th actuator are then obtained as:

$$C_i = \varepsilon_0 \frac{A_i + x_i t_i}{g_i - z_i} = \varepsilon_0 \frac{A_i \pm r_i t_i q_1}{g_i \pm s_i q_2}, \quad (2)$$

$$W_{P,i} = \frac{1}{2} C_i u_i^2$$

with the electrical voltage $u_i$, the dielectric constant $\varepsilon_0$, the gap $g_i$, the overlapping length $l_i$, the depth $t_i$ and the overlapping area $A_i = l_i t_i$ in the nondistorted state. The entire impressed force of the capacitive actuators, $f_2$ in (1), is calculated as follows $$f_{2,i} = \frac{\partial W_{P,i}}{\partial q_2} = \mp \frac{1}{2} \frac{\varepsilon_0 s_i (A_i \pm r_i t_i q_1)}{(g_i \pm s_i q_2)^2} u_i^2, \quad (3)$$

$$f_2(q_1, q_2, u_1, \ldots, u_m) = \sum_{i=1}^{m} f_{2,i}.$$

Equations (2) and (3) show that, depending on the geometric arrangement of the capacitive actuator, a force effect can be applied to the secondary mode which has four different sign permutations, specifically for $x_i = \pm r_i q_1$ and $z_i = \pm s_i q_2$.

If it is firstly assumed that there are precisely four capacitive actuators, which have different sign permutations, the following applies for the force acting on the secondary mode $$f_2 = \frac{\varepsilon_0}{2}\left(\frac{s_1(A_1+r_1t_1q_1)}{(g_1-s_1q_2)^2}u_1^2 - \frac{s_2(A_2+r_2t_2q_1)}{(g_2+s_2q_2)^2}u_2^2 + \frac{s_3(A_3-r_3t_3q_1)}{(g_3-s_3q_2)^2}u_3^2 - \frac{s_4(A_4-r_4t_4q_1)}{(g_4+s_4q_2)^2}u_4^2\right). \quad (4)$$

One preferred embodiment of the control concept is then the input variable transformation $$u_1 = \sqrt{\tilde{u}_T - \tilde{u}_C + \tilde{u}_S}, \quad u_2 = \sqrt{\tilde{u}_T + \tilde{u}_C - \tilde{u}_S},$$

$$u_3 = \sqrt{\tilde{u}_T + \tilde{u}_C + \tilde{u}_S}, \quad u_4 = \sqrt{\tilde{u}_T - \tilde{u}_C - \tilde{u}_S} \quad (5)$$

If the transformation (5) is inserted in (4) and if the expression $f_2$ is linearized according to $q_1$ and $q_2$ about the working point $q_2=0$ and $q_2=0$, an approximate relationship is obtained which is valid for small deflections. Assuming that the gap for all the parallel-plate capacitors is of equal size, i.e. $g=g_j$, and the following geometric relationships are met $sA=s_jA_j$, $rst=r_js_jt_j$ and $s^2A=s_j^2A_j$ for $j=1, \ldots, m$, which can be interpreted as symmetry conditions for the weighted overlapping areas and overlapping lengths, the linear approximation is obtained in the form $$f_2 \cong \underbrace{\frac{2\varepsilon_0 s_j A_j}{g^2}}_{b_2}\tilde{u}_s - \underbrace{\frac{2\varepsilon_0 r_j s_j t_l}{g^2}}_{k_{21,C}}q_1\tilde{u}_c + \underbrace{\frac{4\varepsilon_0 s_j^2 A_j}{g^3}}_{k_{2,T}}q_2\tilde{u}_T. \quad (6)$$

Equation (6) shows that the transformed input variables are now decoupled from one another. Equation (1) can now be written in the form $$m_2\ddot{q}_2 + d_2\dot{q}_2 + (k_2 - k_{2,T}\tilde{u}_T)q_2 = b_2\tilde{u}_S + \Omega c_{21}\dot{q}_1 - (k_{21} + k_{21,C}\tilde{u}_C)q_1 \quad (7)$$

It is directly apparent in (7) that the input $\tilde{u}_S$ can be used for harmonically exciting the secondary mode, the input $\tilde{u}_C$ for compensating the unbalance and the input $\tilde{u}_T$ for trimming the resonance frequency of the secondary mode.

In what has been stated above, the restrictive assumption was made that all the capacitive actuators have rectangular electrodes and do not have degrees of rotational freedom.

The above concept can now be very easily extended to electrodes of any desired shape which can be formed from a finite number of sufficiently small rectangular elements. Assuming a division into sufficiently small elements, it is therefore also possible to approximate the force effect of rotating electrodes of any desired shape, in the above form. Furthermore, it is assumed that the finite actuator elements are combined to form four groups $k=1, \ldots, 4$ with the number $m_K$ of elements with the common sign permutation and are supplied with the voltage $u_K$. If the distributed actuators satisfy the geometric conditions $$sA = \sum_{j=1}^{m_1} s_{1,j}A_{1,j} = \sum_{j=1}^{m_2} s_{2,j}A_{2,j} = \sum_{j=1}^{m_3} s_{3,j}A_{3,j} = \sum_{j=1}^{m_4} s_{4,j}A_{4,j},$$

$$rst = \sum_{j=1}^{m_1} r_{1,j}s_{1,j}t_{1,j} = \sum_{j=1}^{m_2} r_{2,j}s_{2,j}t_{2,j} = \sum_{j=1}^{m_3} r_{3,j}s_{3,j}t_{3,j} = \sum_{j=1}^{m_4} r_{4,j}s_{4,j}t_{4,j},$$

$$s^2A = \sum_{j=1}^{m_1} s_{1,j}^2 A_{1,j} = \sum_{j=1}^{m_2} s_{2,j}^2 A_{2,j} = \sum_{j=1}^{m_3} s_{3,j}^2 A_{3,j} = \sum_{j=1}^{m_4} s_{4,j}^2 A_{4,j}.$$

then the entire force acting on the secondary mode where $$b_2 = 2\frac{\varepsilon_0}{g^2}sA, \quad k_{21,C} = 2\frac{\varepsilon_0}{g^2}rst, \quad k_{2,T} = 4\frac{\varepsilon_0}{g^3}s^2A$$

can in turn be approximated in the form (6).

For the actual exemplary controller design, use is made of what is referred to as an envelope curve model which describes the dynamics of the Fourier coefficients of the system variables. To do this, it is firstly assumed that the primary mode experiences a harmonic oscillation in the form $q_1 = Q_{1,S}\sin(\omega_1 t)$ with the constant amplitude $Q_{1,S}$ and the frequency $\omega_1$, which corresponds to the natural frequency of the primary mode. Furthermore, it is assumed that the secondary mode can be formed as a harmonic oscillation of the form $q_2 = Q_{2,S}\sin(\omega_1 t) + Q_{2,C}\cos(\omega_1 t)$. In the case of harmonic excitation with the input $\tilde{u}_S = \tilde{U}_{S,C}\cos(\omega_1 t)$ and the constant inputs $\tilde{u}_T = \tilde{U}_{T,0}$ and $\tilde{u}_C = \tilde{U}_{C,0}$, the dynamics of the Fourier coefficients $Q_{2,S}$ and $Q_{2,C}$ can be described using the differential equation system $$\frac{d}{dt}\begin{bmatrix}Q_{2,s}\\Q_{2,c}\end{bmatrix} = \begin{bmatrix}\alpha_2 & \omega_1-\omega_2\\-\omega_1+\omega_2 & \alpha_2\end{bmatrix}\begin{bmatrix}Q_{2,s}\\Q_{2,c}\end{bmatrix} + \begin{bmatrix}\beta_{21}\Omega - \beta_2\tilde{U}_{s,c}\\\beta_{21}(\Gamma_M+\Gamma_c\tilde{U}_{c,0}) + \beta_2\tilde{U}_{s,s}\end{bmatrix} \quad (8)$$

with the damping parameter and the natural frequency of the secondary mode $$\alpha_2 = -\frac{1}{2}\frac{d_2}{m_2}, \quad \omega_2 = \sqrt{\frac{k_2 - k_{2,T}\tilde{U}_{T,0}}{m_2} - \alpha_2^2} \quad (9)$$

as well as the input and unbalance parameters $$\beta_2 = \frac{1}{2}\frac{b_2}{m_2\omega_2}, \quad \beta_{21} = \frac{1}{2}\frac{\omega_1}{\omega_2}\frac{c_{21}}{m_2}Q_{1,s}, \quad \Gamma_M = \frac{k_{21}}{\omega_1 c_{21}}, \quad \Gamma_c = \frac{k_{21c}}{\omega_1 c_{21}} \quad (10)$$

and the inputs $\tilde{U}_{T,0}$, $\tilde{U}_{C,0}$, $\tilde{U}_{S,S}$ and $\tilde{U}_{S,C}$. In the text which follows, the harmonically oscillating system variables ($q_2$, $\tilde{u}_s$, ...) are denoted as "fast" signals and the associated Fourier coefficients ($Q_{2,S}$, $Q_{2,C}$, $\tilde{U}_{S,S}$, $\tilde{U}_{S,C}$, ...) are denoted as "slow" signals.

For the operation of the rotation rate sensor, it is possible to differentiate between the so-called "split mode" and the "matched mode". In the split mode operation, the input $\tilde{U}_{T,0}$ is constant and the absolute value of the difference between the frequencies assumes a constant value $|\omega_1 - \omega_2| \gg 1$. Since the change in the sensitivity owing to different damping parameters $d_2$ and therefore $\alpha_2$ does not play a significant role for a sufficiently large frequency difference, it is not necessary to control the secondary natural frequency and offline identification of the parameters $\alpha_2$ and $\omega_1 - \omega_2$ is sufficient. On the other hand, in the matched mode operation, a frequency interval $\omega_1 - \omega_2 \to 0$ which is as small as possible is aimed at. The change in sensitivity has its maximum in the vicinity of the point $\omega_1 = \omega_2$, for which reason frequency control and online identification of the frequency interval $\omega_1 - \omega_2$ are unavoidable.

Since the output signal $y=c_2q_2$ is used both for resetting the unknown rotation rate and for compensating the unknown unbalance, no further information, for example about the frequency difference, can be acquired from the output signal. For this purpose, there is a need for additional excitation of the secondary mode which contains frequency components in the spectrum which are different from the natural frequency $\omega_1$. A possibility which can be implemented easily is harmonic excitation with the frequency $\omega_s=\omega_1/l$ and $l \gg 1$.

If input variables of the envelope curve model (8) of the form $\tilde{U}_{S,S}=\tilde{U}_{S,S0}+\tilde{U}_{S,SS}\sin(\omega_s t)+U_{S,SC}\cos(\omega_s t)$ and $\tilde{U}_{S,C}=\tilde{U}_{S,C0}+\tilde{U}_{S,CS}\sin(\omega_s t)+\tilde{U}_{S,CC}\cos(\omega_s t)$ as well as corresponding state variables $Q_{2,S}=Q_{2,S0}+Q_{2,SS}\sin(\omega_s t)+Q_{2,SC}\cos(\omega_s t)$ and $Q_{2,C}=Q_{2,C0}+Q_{2,CS}\sin(\omega_s t)+Q_{2,CC}\cos(\omega_s t)$ are thus assumed, it is possible, by ignoring the coupling terms relating to the primary mode, to specify the dynamics of the new Fourier coefficients $Q_{2,SS}$, $Q_{2,SC}$, $Q_{2,CS}$ and $Q_{2,CC}$ (SC subsystem) by means of an envelope curve model of the form $$\frac{d}{dt}\begin{bmatrix} Q_{2,ss} \\ Q_{2,sc} \\ Q_{2,cs} \\ Q_{2,cc} \end{bmatrix} = \begin{bmatrix} \alpha_2 & \omega_s & \omega_1-\omega_2 & 0 \\ -\omega_s & \alpha_2 & 0 & \omega_1-\omega_2 \\ -\omega_1+\omega_2 & 0 & \alpha_2 & \omega_s \\ 0 & -\omega_1+\omega_2 & -\omega_s & \alpha_2 \end{bmatrix} \quad (11)$$

$$\begin{bmatrix} Q_{2,ss} \\ Q_{2,sc} \\ Q_{2,cs} \\ Q_{2,cc} \end{bmatrix} + \begin{bmatrix} 0 & 0 & -\beta_2 & 0 \\ 0 & 0 & 0 & -\beta_2 \\ \beta_2 & 0 & 0 & 0 \\ 0 & \beta_2 & 0 & 0 \end{bmatrix}\begin{bmatrix} \tilde{U}_{s,ss} \\ \tilde{U}_{s,sc} \\ \tilde{U}_{s,cs} \\ \tilde{U}_{s,cc} \end{bmatrix}.$$

The dynamics of the Fourier coefficients $Q_{2,S0}$ and $Q_{2,C0}$ (0 subsystem) is described by the envelope curve model $$\frac{d}{dt}\begin{bmatrix} Q_{2,sc} \\ Q_{2,c0} \end{bmatrix} = \begin{bmatrix} \alpha_2 & \omega_1-\omega_2 \\ -\omega_1+\omega_2 & \alpha_2 \end{bmatrix} \quad (12)$$

$$\begin{bmatrix} Q_{2,s0} \\ Q_{2,c0} \end{bmatrix} - \begin{bmatrix} \beta_{21}\Omega - \beta_1\tilde{U}_{s,c0} \\ \beta_{21}(\Gamma_M + \Gamma_c\tilde{U}_{c,0}) + \beta_2\tilde{U}_{s,s0} \end{bmatrix}$$

It is now assumed below that the "fast" output signal $y=c_2q_2$ is adjusted by means of a robust controller $R_R(B)$ to a harmonic setpoint value $y_D=Y^*_{CC}\cos(\omega_s t)\cos(\omega_1 t)$ where $\omega_S=\omega_1/l$ and $l \gg 1$. If it is firstly assumed that this subordinate resetting control is ideal and the output y precisely follows the setpoint value $y_D$, that is to say the following applies: $Q_{2,SS}=0$, $Q_{2,SC}=0$, $Q_{2,CS}=0$ and $Q_{2,CC}=Y_{CC}/C_2$, the input variable $U_S=[\tilde{U}_{S,S}\ \tilde{U}_{S,C}]$ in the steady state is obtained from equation (11) and equation (12) in the form $$\tilde{U}_{s,c} = \underbrace{\frac{\beta_{21}}{\beta_2}\Omega}_{\tilde{U}_{s,c0}} + \underbrace{\frac{\omega_1-\omega_2}{\beta_2 c_2}Y'_{cc}\cos(\omega_s t)}_{\tilde{U}_{s,cc}}, \quad (13)$$

$$\tilde{U}_{ss} = -\underbrace{\frac{\Gamma_M}{\Gamma_C}}_{\tilde{U}_{s,s0}} - \underbrace{\frac{\omega_s}{\beta_2 c_2}Y'_{cc}\sin(\omega_s t)}_{\tilde{U}_{s,ss}} - \underbrace{\frac{\alpha_2}{\beta_2 c_2}Y'_{cc}\cos(\omega_s t)}_{\tilde{U}_{s,sc}}.$$

The individual components $\tilde{U}_{S,C0}$, $\tilde{U}_{S,CC}$ and $\tilde{U}_{S,S0}$ can be acquired by demodulating the manipulated variable $\tilde{u}_S$, as is shown in FIG. 2. The Fourier coefficient $\tilde{U}_{S,C0}$ in (13) is proportional to the rotation rate and therefore serves as an output of the rotation rate sensor.

The actual quadrature control is then carried out by compensating the variable $\tilde{U}_{S,S0}$ by means of the input variable $\tilde{U}_{C,0}$. The distance from the input $\tilde{U}_{C,0}$ to the output $\tilde{U}_{S,S0}$ which is used as the basis for the design of the quadrature controller $R_Q(s)$ is given by the steady-state relationship $$G_Q = -\frac{\beta_{21}\Gamma_M}{\beta_2}. \quad (14)$$

Furthermore, from (13) it is apparent that the Fourier coefficient $\tilde{U}_{S,CC}$ is linearly dependent on the frequency difference $\omega_1-\omega_2$. The frequency difference can therefore be calculated in the form $\omega_1-\omega_2=\tilde{U}_{S,CC}\beta_2 c_2/Y^*_{CC}$. The frequency controller then has the function of adjusting the Fourier coefficient $\tilde{U}_{S,CC}$ to zero. The transmission function, serving as a basis for the frequency control with the controller $R_F(s)$, of the distance from the input $\tilde{U}_{T,0}$ to the output $\tilde{U}_{S,CC}$, which is linearized about the working point $\omega_1=\omega_2$, is given by the steady-state relationship $$G_s = \frac{\partial \tilde{U}_{s,cc}}{\partial \tilde{U}_{T,0}}\bigg|_{\omega_1=\omega_2} = -\frac{1}{2}\frac{k_{2T}}{\beta_2 c_2 m_2 \omega_1}Y'_{cc} \quad (15)$$

The associated cascaded control structure is illustrated in FIG. 2.

In reality, the transmission function of the closed circuit of the subordinate resetting controller is not precisely equal to 1. The response to the defined harmonic setpoint value then has a phase shift $\omega_0$ and change $A_0$ in amplitude in the steady state which can be corrected in the subsequent demodulation by demodulating with $A_0\cos(\omega_s t+\phi_0)$ instead of $\cos(\omega_s t)$.

Figure 3:
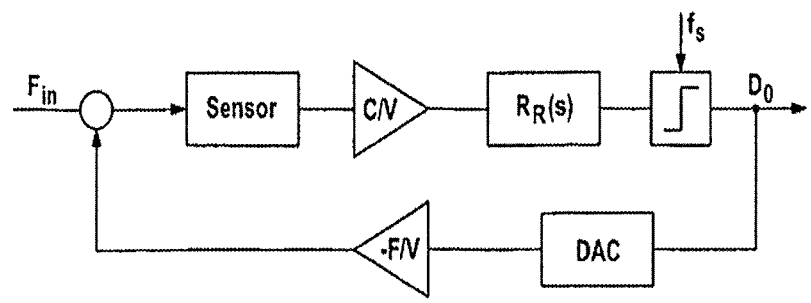
FIG. 3 shows an exemplary model of a 1-bit electro-mechanical sigma-delta modulator with a sensor and filter structure or first controller.
Figure 4:
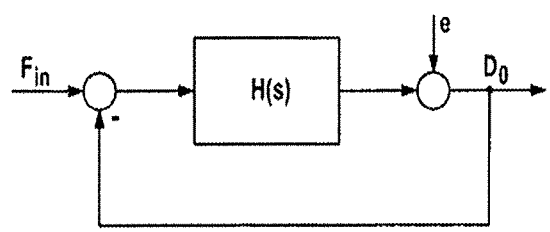
FIG. 4 shows an exemplary illustration of a simplified control circuit.

The exemplary reading out of a sensor by means of an electro-mechanical sigma-delta (SD) modulator in the locking mode (resetting controller) provides a large number of advantages over conventional reading systems without locked operation. As a result of the locked operation, it is possible, inter alia, to improve the bandwidth, the dynamic range and the linearity. The design of an electro-mechanical SD modulator is shown in FIG. 3 and is composed of a sensor, the capacitance/voltage converter (C/V), the filter or the first controller unit $R_R(s)$, which corresponds to the resetting controller described above, a quantizer with a sampling frequency $f_S$, the digital/analog converter (DAC) and a voltage/force transducer (−F/V). The stability of the closed circuit is brought about by suitable dimensioning of the filter. In FIG. 4, a simplified control circuit is shown with an input $F_{in}$, a transmission function H(s), which models the system comprised of the sensor and filter $R_R(s)$, the quantization noise e and an output $D_0$ which is fed back. The output signal for the closed circuit is obtained in the Laplace space as $$D_0 = F_{in}\underbrace{\frac{1}{1+\frac{1}{H(s)}}}_{STF} + e\underbrace{\frac{1}{1+H(s)}}_{NTF}. \quad (16)$$

Figure 5:
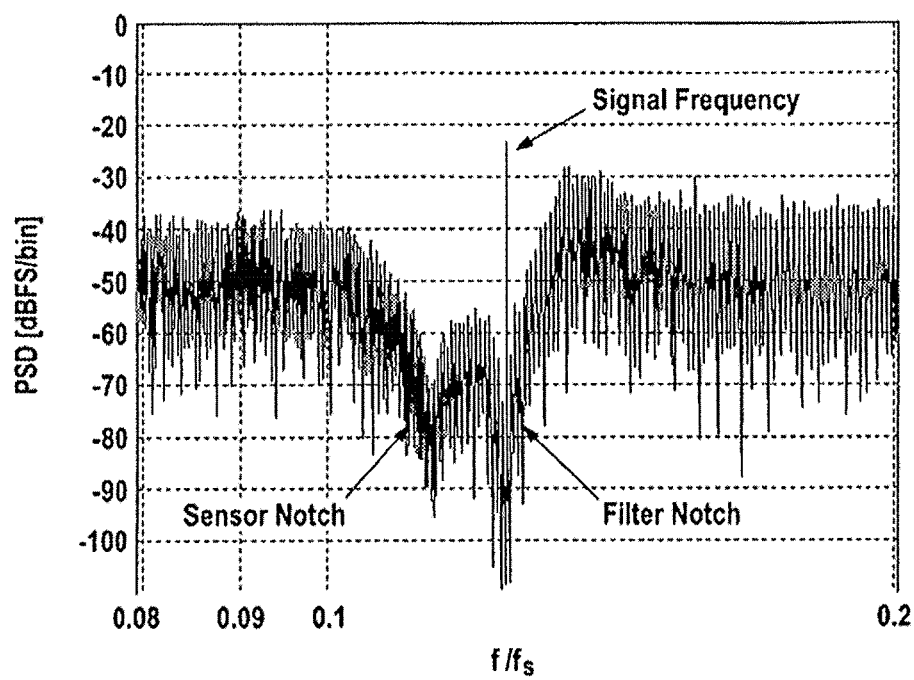
FIG. 5 shows an illustration of a simplified spectrum of an electro-mechanical sigma-delta modulator, FIG. 6 a) shows an exemplary multi-bit feedback to an electrode and b) shows a single-bit feedback via a plurality of electrodes.

By means of the signal transmission function (STF) and the noise transmission function (NTF) in (16) it is possible to determine that large amplification of the filter is desirable in the signal band in order, on the one hand, to transmit the input signal $F_{in}$ with one to the output $D_0$ (e.g. it is then possible to assume an ideal resetting control ($y=y_D$) for the rest of the controller design, as explained above) and, on the other hand, to suppress the quantization noise. In the case of rotation rate sensors, a band pass filter can preferably be used with a resonance frequency which corresponds to the primary resonance frequency of the rotation rate sensor. FIG. 5 shows a spectrum of the SD modulator presented. Two local minimums can be determined in the spectrum; the right-hand one results from the band pass filter and the left-hand one from the transmission function of the rotation rate sensor owing to the secondary mode. Here, it is immediately apparent that the quality can be considerably improved if the two local minimums lie one on top of the other.

Figure 6:
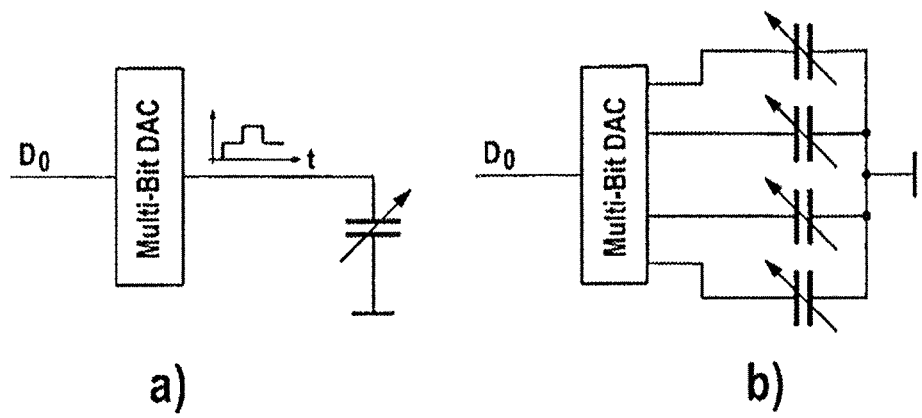

In the case of the SD modulator, the digital output signal is fed back to the sensor element via a DAC. The linearity of the sensor is improved by the active feedback. This causes the measurement signal at the input to be compensated as much as possible, so that in the ideal case the sensor has a negligible differential signal. In the case of the SD principle, the statement should be modified to the effect that the signal which is to be measured is compensated on average, and the fault only acts on the sensor as an input signal. The use of multi-bit solutions permits the variance between the input signal and output signal to be reduced, thereby improving the quality of the overall system with respect to linearity. The feedback is carried out capacitively via a pulse-width-modulated signal, a single or multi-bit voltage signal or a single or multi-bit charge signal. The multi-bit feedback can be obtained either by means of a specific D/A converter, which carries out implicit linearization of the feedback force, as in FIG. 6a, or by using a plurality of feedback electrodes, as can be seen in FIG. 6b.

Figure 7:
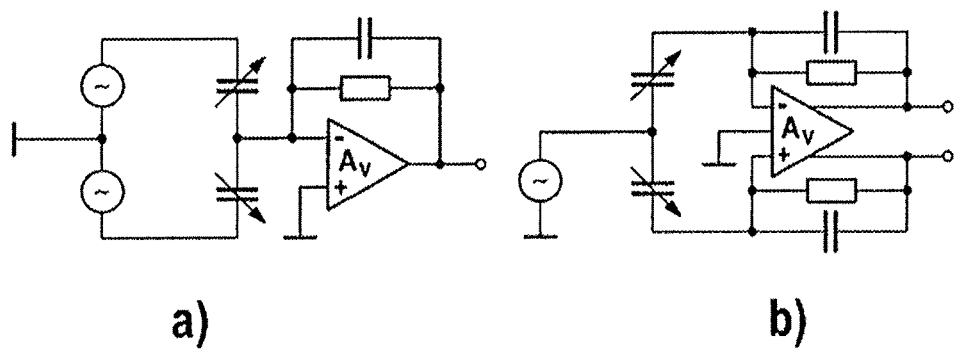
FIG. 7 shows exemplary reading circuits with a) a single-ended design and b) a differential design.

Using SD converters with continuous timing allows the powering to be significantly reduced. This is possible since the RC technology requires smaller bandwidths for the operational amplifiers (OPV). Compared to the switch/capacitor technology, this may be a bandwidth which is smaller by a factor of up to 10. As a result, the current consumption can also be reduced by the same factor. For the evaluation circuit with continuous timing it is possible to select two different approaches. The first is based on tapping the signal from the center electrode, as can be seen in FIG. 7a. This approach provides the advantage that only one amplifier is required for the evaluation circuit. Disadvantages of this method are the complicated generation of the modulation signal, which should be phase-shifted through precisely 180°, and that as a result of the feedback no additional signals can be transmitted to the center electrode. For these reasons, a fully differential design is also frequently selected which does not have the abovementioned disadvantages and is illustrated in FIG. 7b. As a third alternative, a dedicated amplifier can be selected for each capacitor. However, this results in a large number of amplifiers and increases the chip surface.

In this section, the control concept presented above and the sigma-delta modulator are combined to form a further exemplary embodiment which is illustrated with respect to FIG. 8. In the digital control block, the signal $ũ_S$ is replaced by $ũ_{SD}$. The signal $ũ_{SD}$ defines the force feedback of the sigma-delta modulator and can be set to a constant value. The three different manipulated variables $ũ_{SD}$, $Ũ_{C,0}$ and $Ũ_{T,0}$ are prevented from influencing one another by means of the input variable transformation described. The four voltages $u_{1+}$, $u_{2-}$, $u_{3+}$, and $u_{4-}$ are impressed, via the mixers M1 and M2, on the corresponding electrodes of the capacitive actuators of the rotation rate sensor. Here, $u_{1+}$ and $u_{4-}$ as well as $u_{2-}$ and $u_{3+}$ are the same with respect to the manipulated variables $Ũ_{C,0}$ and $Ũ_{T,0}$ and differ only in the force feedback value $ũ_{SD}$. The sigma-delta modulator is composed of a capacitance/voltage converter (C/V), a loop filter ($R_R(s)$), a 1-bit quantizer, which is clocked with a sampling frequency $f_s$, and a force feedback (DAC) defined by the two mixers M1 and M2. The two mixers M1 and M2 are actuated with the output signal of the sigma-delta modulator. The force feedback acting on the sensor by means of the voltages $u_1$, $u_2$, $u_3$ and $u_4$ therefore occurs as a result of switching over between the current levels of the signals $u_{1+}$ and $u_{4-}$ or $u_{2-}$ and $u_{3+}$.

As a result of the combination of the quadrature controller and frequency controller as well as the sigma-delta modulator it is possible to combine the advantages of the respective concepts, as described by way of example in the sections above.

One particularly advantageous feature of the method and of the rotation rate sensor is the nonlinear input variable transformation (5) as well as the use of an electro-mechanical sigma-delta modulator with continuous timing.

The use of the SD converter with continuous timing for reading out sensors brings a wide variety of advantages. The first advantage is the reduced power consumption compared to the switch/capacitor technology. As a result of the fact that signals with continuous timing are used, the operational amplifiers which are used require less bandwidth up to a factor of 10, and therefore less current up to a factor of 10. This leads to drastically lower energy consumption, which plays a particular role especially in the strongly growing market of mobile sensor systems. Furthermore, SD converters with continuous timing have an implicit anti-aliasing filter, which filters frequencies above $f_s/2$. Although the sensor already has a low-pass behavior, it does not sufficiently reduce frequencies above the Nyquist frequency, and the properties of this filter cannot be freely adjusted either. The properties of SD converters with continuous timing reduce the expenditure on circuitry and the costs as well as the necessary power consumption. Furthermore, the lack of cyclical recharging of the reading electrodes on the test mass results in a smaller reading force, which leads to an increase in the signal-to-noise interval and therefore to improved resolution.

Conventional methods for controlling the secondary resonance frequency of capacitive rotation rate sensors dispense with the compensation of inherent quadratic input nonlinearity. If a quadrature controller and/or resetting controller is required for the operation of the rotation rate sensor, this results in the frequency controller, quadrature controller and resetting controller influencing one another. Since, in particular in the case of a resetting controller, the output signal of the rotation rate sensor corresponds to the required manipulated variable for resetting the rotation rate, the problem occurs here that the output variable of the rotation rate sensor is influenced directly by the frequency controller. If the secondary resonance frequency therefore changes, for example owing to temperature influences, and the frequency controller compensates the resulting control error, a change occurs in the output signal also. This undesired effect can be avoided by the proposed input variable transformation with the result that complicated corrections by means of characteristic curve fields are not necessary.

The frequency controller, quadrature controller and resetting controller can be designed independently of one another for the completely decoupled overall system with the new, transformed input variables ($\tilde{u}_T$, $\tilde{u}_C$ and $\tilde{u}_S$). The proposed control concept has the advantage that there is no longer a need for demodulation of the output signal and therefore no longer a need for decoupling of the quadrature signal and rotation rate signal provided that the "fast" resetting controller is configured to be sufficiently robust with respect to changes in parameter (in particular of the secondary resonance frequency). Decomposition into a quadrature component and rotation rate component is effected by demodulation of the manipulated variable of the resetting controller. Furthermore, the proposed control concept has the advantage of a linear relationship between the resonance frequency and the associated measurement signal ($\tilde{U}_{S,CC} = Y^*_2$, $cc(\omega_1-\omega_2)/(\beta_2 c_2)$) and therefore enables a stable influence zone of any desired size for the frequency controller.

The invention claimed is:

1. A method for the precise measuring operation of a micro-mechanical rotation rate sensor, comprising at least one seismic mass, at least one drive device for driving the seismic mass in a primary mode ($q_1$) and at least four trimming electrode elements which are jointly associated directly or indirectly with the seismic mass, wherein in each case an electric trimming voltage ($u_1$, $u_2$, $u_3$, $u_4$) is applied between each of these trimming electrode elements and the seismic mass, wherein the rotation rate sensor comprises a control arrangement to measure rotation rate, and wherein the control arrangement comprises a sigma-delta converter with which a controlled variable (y) representing the detected deflection of the seismic mass in its secondary mode ($q_2$) is digitized directly or at least a variable dependent thereon is digitized, and after which:

1) a resetting variable ($\tilde{u}_S$) is generated as a digital variable, and
2) both a resonance frequency manipulated variable ($\tilde{u}_T$), and a quadrature manipulated variable ($\tilde{u}_C$) are generated as digital variables based on the digital resetting variable ($\tilde{u}_S$), and wherein each of the electric trimming voltages ($u_1$, $u_2$, $u_3$, $u_4$) is set as a function of a square root of a different sum of the digitized resonance frequency manipulated variable ($\tilde{u}_T$), the quadrature manipulated variable ($\tilde{u}_C$) and another resetting variable ($\tilde{u}_S$).

2. The method as claimed in claim 1, wherein the rotation rate sensor comprises at least four trimming electrode elements which are jointly associated directly or indirectly with the seismic mass, wherein a first electric trimming voltage is applied between the first trimming electrode element and the seismic mass, a second trimming voltage is applied between the second trimming electrode element and the seismic mass, a third trimming voltage is applied between the third trimming electrode element and the seismic mass, and a fourth trimming voltage is applied between the fourth trimming electrode element and the seismic mass, wherein the first trimming voltage $u_1$, the second trimming voltage $u_2$, the third trimming voltage $u_3$ and the fourth trimming voltage $u_4$ are each set substantially with the following dependence of the resonance frequency manipulated variable $\tilde{u}_T$, the quadrature manipulated variable $\tilde{u}_C$ and the resetting variable $\tilde{u}_S$:

$$u_1 = \sqrt{\tilde{u}_T - \tilde{u}_C + \tilde{u}_S}, \quad u_2 = \sqrt{\tilde{u}_T + \tilde{u}_C - \tilde{u}_S},$$

$$u_3 = \sqrt{\tilde{u}_T + \tilde{u}_C + \tilde{u}_S}, \quad u_4 = \sqrt{\tilde{u}_T - \tilde{u}_C - \tilde{u}_S}.$$

3. The method as claimed in claim 1, wherein the trimming electrode elements are each embodied and arranged in such a way that a capacitance $C_1$, $C_2$, $C_3$ and $C_4$ is formed between the first, second, third and fourth trimming electrode element and a respectively associated mass electrode element of the associated seismic mass, with the associated trimming voltage being applied between the trimming electrode element and the mass electrode element, as follows:

$$C_1 = \varepsilon_0 \frac{A_1 + r_1 t_1 q_1}{g_1 - s_1 q_2}, \quad C_2 = \varepsilon_0 \frac{A_2 + r_2 t_2 q_1}{g_2 + s_2 q_2}, \quad C_3 = \varepsilon_0 \frac{A_3 - r_3 t_3 q_1}{g_3 - s_3 q_2}$$

and $$C_4 = \varepsilon_0 \frac{A_4 - r_4 t_4 q_1}{g_4 + s_4 q_2},$$

where i is in each case an index relating to the numbering of the electrode elements, $g_i$ is the distance over the gap between the trimming electrode element and the associated mass electrode element in the undeflected state, $A_i$ is the overlapping area between the trimming electrode element and the associated mass electrode element in the undeflected state, the product $\pm r_i$ times $t_i$ times $q_1$ is the change in the overlapping area as a function of the deflection of the primary mode $q_1$, wherein $t_i$ is the overlapping depth between the trimming electrode element and the associated mass electrode element and $r_i$ is a first positive geometric constant relating to the deflection of the primary mode $q_1$, and the product $\pm s_i$ times $q_2$ is the change in the distance over the gap between the trimming electrode element and the mass electrode element as a function of the deflection of the secondary mode $q_2$, wherein $s_i$ is a second positive geometric constant relating to the deflection of the secondary mode $q_2$.

4. The method as claimed in claim 3, wherein $A_i$, $r_i$, $t_i$, $g_i$ and $s_i$ are substantially the same in all the trimming electrode element/mass electrode element pairs.

5. The method as claimed in claim 1, wherein the control arrangement firstly forms a control error variable from the controlled variable (y) with predefinition of a control reference variable, wherein the controlled variable (y) represents the detected deflection of the seismic mass in the direction of its secondary mode, and wherein the control reference variable is a harmonic frequency identification signal ($y_D$) with the frequency $\omega_s$ modulated with the frequency of the primary mode ($\omega_1$), or such a frequency identification signal is superimposed on the control reference variable, after which the control error variable formed in this way is fed to a first controller unit in which at least the resetting variable ($\tilde{u}_S$) is generated.

6. The method as claimed in claim 5, wherein the resetting variable ($\tilde{u}_S$) is then demodulated with two harmonic signals, phase-shifted through 90° with respect to one another, in a first demodulator unit, as a result of which a quadrature variable and a rotation rate variable are acquired, after which a quadrature control error variable is generated from the quadrature variable as a function of a quadrature reference variable, which quadrature control error variable is fed to a quadrature controller unit which makes available the quadrature manipulated variable ($\tilde{u}_C$) on the output side, and wherein the rotation rate variable or quadrature variable is demodulated in a second demodulator unit with the frequency $\omega_s$, as a result of which a frequency variable is acquired, after which a frequency control error variable is generated from the frequency variable as a function of a frequency reference variable, which frequency control error variable is fed to a frequency controller unit which makes available the resonance frequency manipulated variable ($\tilde{u}_T$) on the output side.

7. The method as claimed in claim 1, wherein the control arrangement firstly forms a control error variable from the controlled variable (y) with predefinition of a control reference variable, wherein the controlled variable (y) represents the detected deflection of the seismic mass in the direction of its secondary mode, and wherein the control reference variable is a harmonic frequency identification signal ($y_D$) with the frequency $\omega_s$ modulated with the frequency of the primary mode ($\omega_1$), or such a frequency identification signal is superimposed on the control reference variable, after which the control error variable which is formed in this way is fed to a first controller unit whose output signal is then demodulated with two harmonic signals, phase-shifted through 90° with respect to one another, in a first demodulator unit, as a result of which a quadrature variable and a rotation rate variable are acquired, after which a quadrature control error variable is generated from the quadrature variable as a function of a quadrature reference variable, which quadrature control error variable is fed to a quadrature controller unit which makes available the quadrature manipulated variable ($\tilde{u}_C$) on the output side and wherein the rotation rate variable or quadrature variable is demodulated in a second demodulator unit with the frequency $\omega_s$, as a result of which a frequency variable is acquired, after which a frequency control error variable is generated from the frequency variable as a function of a frequency reference variable, which frequency control error variable is fed to a frequency controller unit which makes available the resonance frequency manipulated variable ($\tilde{u}_T$) on the output side.

8. The method as claimed in claim 7, wherein the rotation rate sensor has a resetting unit which makes available the resetting variable ($\tilde{u}_S$), wherein this resetting variable ($\tilde{u}_S$) has a defined constant resetting value.

9. The method as claimed in claim 7, wherein the output signal of the first controller unit is digitized, and at least the first demodulator unit, the second demodulator unit, the quadrature controller unit and the frequency controller unit are embodied in a digital form, and, in addition at least one of a manipulated variable transformation unit and a resetting unit are also embodied in a digital form.

10. The method as claimed in claim 1, wherein the sigma-delta converter is embodied as an electro-mechanical sigma-delta converter.

11. The method as claimed in claim 10, wherein the sigma-delta converter comprises a capacitance/voltage converter which is arranged upstream of the first controller unit on the input side, the first controller unit itself, a quantizer which is connected to the latter on the output side, and a digital/analog converter and a voltage/force transducer for feeding back the control process.

12. The method as claimed in claim 11, wherein in each case two trimming voltages are processed in pairs ($u_1$, $u_4$), ($u_2$, $u_3$), in each case by means of one mixer (M1, M2), in each case in pairs as a function of the digital output signal of the quantizer.

13. The method as claimed in claim 1, wherein the control arrangement of the rotation rate sensor, has a manipulated variable transformation unit which makes available the trimming voltages $u_1$, $u_2$, $u_3$ and $u_4$ as a function of the resonance frequency manipulated variable $\tilde{u}_T$, the quadrature manipulated variable $\tilde{u}_C$ and the resetting variable $\tilde{u}_S$, in accordance with the equations $u_1 = \sqrt{\tilde{u}_T - \tilde{u}_C + \tilde{u}_S}$, $u_2 = \sqrt{\tilde{u}_T + \tilde{u}_C - \tilde{u}_S}$, $u_3 = \sqrt{\tilde{u}_T + \tilde{u}_C + \tilde{u}_S}$, $u_4 = \sqrt{\tilde{u}_T - \tilde{u}_C - \tilde{u}_S}$.

14. A micro-mechanical rotation rate sensor, comprising at least one seismic mass, at least one drive device for driving the seismic mass in the primary mode and at least three trimming electrode elements which are jointly associated directly or indirectly with the seismic mass, wherein in each case an electric trimming voltage is applied between each of these trimming electrode elements and the seismic mass, wherein the rotation rate sensor is embodied in such a way that it is suitable for carrying out the method comprising:

a method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, wherein in each case an electric trimming voltage ($u_1$, $u_2$, $u_3$, $u_4$) is applied between each of these trimming electrode elements and the seismic mass, wherein the rotation rate sensor comprises a control arrangement to measure rotation rate, and wherein the control arrangement comprises a sigma-delta converter with which a controlled variable (y) representing the detected deflection of the seismic mass in its secondary mode ($q_2$) is digitized directly or at least a variable dependent thereon is digitized, and after which:

1) and a resetting variable ($\tilde{u}_S$) is generated as a digital variable, and
2) both a resonance frequency manipulated variable ($\tilde{u}_T$), and a quadrature manipulated variable ($\tilde{u}_C$) are generated as digital variables based on the digital resetting variable ($\tilde{u}_S$), and wherein each of the electric trimming voltages ($u_1$, $u_2$, $u_3$, $u_4$) is set as a function of a square root of a different sum of the digitized resonance frequency manipulated variable ($\tilde{u}_T$), the quadrature manipulated variable ($\tilde{u}_C$) and another resetting variable ($\tilde{u}_S$).

15. A method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, wherein in each case an electric trimming voltage ($u_1$, $u_2$, $u_3$, $u_4$) is applied between each of these trimming electrode elements and the seismic mass, wherein each of these electric trimming voltages ($u_1$, $u_2$, $u_3$, $u_4$) is set as a function of a resonance frequency manipulated variable ($\tilde{u}_T$), a quadrature manipulated variable ($\tilde{u}_C$) and a resetting variable ($\tilde{u}_S$);

wherein the rotation rate sensor comprises a control arrangement to measure a rotation rate, and wherein the control arrangement comprises a sigma-delta converter with which a controlled variable (y) representing the detected deflection of the seismic mass in its secondary mode ($q_2$) is digitized directly or at least a variable dependent thereon is digitized, and after which the resonance frequency manipulated variable ($\tilde{u}_T$), the quadrature manipulated variable ($\tilde{u}_C$) and the resetting variable ($\tilde{u}_S$) are generated as digital variables, and wherein the control arrangement firstly forms a control error variable from the controlled variable (y) with predefinition of a control reference variable, wherein the controlled variable (y) represents the detected deflection of the seismic mass in the direction of its secondary mode, and wherein the control reference variable is a harmonic frequency identification signal ($y_D$) with the frequency $\omega_s$ modulated with the frequency of the primary mode ($\omega_1$), or such a frequency identification signal is superimposed on the control reference variable, after which the control error variable formed in this way is fed to a first controller unit in which at least the resetting variable ($\tilde{u}_S$) is generated.

* * * * *